US010115123B2

(12) United States Patent
McHugh et al.

(10) Patent No.: US 10,115,123 B2
(45) Date of Patent: Oct. 30, 2018

(54) EXECUTION ENGINE FOR GENERATING REPORTS FOR MEASURING EFFECTIVENESS OF ADVERTISING CAMPAIGNS

(71) Applicant: Facebook, Inc., Menlo Park, CA (US)

(72) Inventors: Jason George McHugh, Seattle, WA (US); Sean Michael Snyder, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 1021 days.

(21) Appl. No.: 14/488,577

(22) Filed: Sep. 17, 2014

(65) Prior Publication Data
US 2016/0078470 A1   Mar. 17, 2016

(51) Int. Cl.
*G06F 7/00* (2006.01)
*G06Q 30/02* (2012.01)

(52) U.S. Cl.
CPC .................. *G06Q 30/0242* (2013.01)

(58) Field of Classification Search
CPC ............ G06Q 30/0242; G06F 11/3065; G06F 11/3068; G06F 11/3072; G06F 11/3086; G06F 19/3487; G06F 21/552
USPC .......................... 707/603, 714, 754, 999.102
See application file for complete search history.

(56) References Cited

U.S. PATENT DOCUMENTS

| | | | | |
|---|---|---|---|---|
| 5,799,286 A * | 8/1998 | Morgan | ............. | G06Q 10/0631 705/30 |
| 6,067,523 A * | 5/2000 | Bair | .................... | G06F 19/3487 705/2 |
| 7,234,112 B1 * | 6/2007 | Brown | .............. | G06F 17/30433 715/255 |
| 9,746,985 B1 * | 8/2017 | Humayun | ......... | G06F 17/30672 |
| 2003/0088447 A1 * | 5/2003 | Desbiens | ............... | G06Q 10/06 707/802 |
| 2004/0138939 A1 * | 7/2004 | Theiler | ............ | G06Q 10/06311 705/7.27 |
| 2005/0038693 A1 * | 2/2005 | Janus | ................. | G06Q 10/0637 705/7.36 |

(Continued)

OTHER PUBLICATIONS

Interactive Advertising Bureau, "Attribution Primer 1.0," Jun. 21, 2012, eleven pages.

(Continued)

*Primary Examiner* — Mohammed R Uddin
(74) *Attorney, Agent, or Firm* — Fenwick & West LLP

(57) ABSTRACT

A report execution engine processes reports for evaluating advertising campaigns. The report execution engine maintains a plurality of generators, each generator including instructions to generate execution plans for one or more columns of a report. The report execution engine uses different generators for generating sub-plans for processing columns of the report. A generator generates a sub-plan for processing a column of the report and invokes other generators for generating sub-plans for remaining columns of the report. The generator receives a sub-plan for the remaining columns of the report from another generator and generates a combined execution plan based on the sub-plans. An execution plan comprises a hierarchical structure of nodes, each node representing a portion of computation of the report. The report execution engine generates the report based on the execution plan and sends the results for presentation.

22 Claims, 9 Drawing Sheets

(56) References Cited

U.S. PATENT DOCUMENTS

| | | | |
|---|---|---|---|
| 2005/0055269 A1* | 3/2005 | Roetter | G06Q 30/02 705/14.53 |
| 2005/0097088 A1 | 5/2005 | Bennett | G06F 17/30899 |
| 2006/0004813 A1* | 1/2006 | Desbiens | G06F 17/30554 |
| 2006/0047562 A1* | 3/2006 | Kiefer | G06Q 10/06375 705/7.37 |
| 2006/0136250 A1* | 6/2006 | Farmilo | G06Q 10/06 705/7.37 |
| 2007/0033104 A1* | 2/2007 | Collins | G06F 17/2785 705/14.41 |
| 2007/0112696 A1* | 5/2007 | Vane | G06N 5/043 706/10 |
| 2008/0183687 A1* | 7/2008 | Law | G06F 17/30389 |
| 2008/0250264 A1* | 10/2008 | Hourselt | G06Q 10/06 714/2 |
| 2009/0089131 A1* | 4/2009 | Moukas | G06Q 10/0631 705/70 |
| 2009/0099999 A1* | 4/2009 | Warren | G06F 17/30522 |
| 2009/0106059 A1* | 4/2009 | Megiddo | G06Q 10/06 705/7.15 |
| 2009/0228301 A1* | 9/2009 | Youngblood | G06Q 40/08 705/3 |
| 2009/0319344 A1* | 12/2009 | Tepper | G06Q 10/06393 705/7.39 |
| 2011/0145166 A1* | 6/2011 | Kmak | G06Q 10/10 705/36 R |
| 2011/0276396 A1* | 11/2011 | Rathod | G06F 17/30867 705/14.49 |
| 2011/0313844 A1* | 12/2011 | Chandramouli | G06Q 30/0241 705/14.42 |
| 2012/0278164 A1* | 11/2012 | Spivack | G06Q 10/10 705/14.52 |
| 2014/0129331 A1* | 5/2014 | Spivack | G06Q 30/0269 705/14.53 |
| 2014/0325331 A1* | 10/2014 | Madireddi | G06F 17/243 715/224 |
| 2015/0149441 A1* | 5/2015 | Nica | G06F 17/30442 707/719 |

OTHER PUBLICATIONS

Gochtovtt, A., "Understanding Digital Advertising Attribution," *Cognizant 20-20 Insights,* Jun. 2012, nine pages.

Kireyev, P. et al., "Do Display Ads Influence Search? Attribution and Dynamics in Online Advertising," Harvard Business School, Working Paper, 13-070, Feb. 9, 2013, thirty-two pages.

Adometry, Inc., "The Evolution of Advanced Attribution," 2012, two pages.

Adometry, Inc., "The Key to Online Display Advertising Success: Taming the Data Explosion with Advanced Attribution," 2013, six pages.

* cited by examiner

REPORT DEFINITION [ Cancel ] [ Preview ] [ Generate Report ] [ Save ]

Basic Info

310 — REPORT NAME*
search campaign report

315 — DESCRIPTION
This report shows information about search campaign SC1.

320 — SHOW DATA FOR*
[ All Dates ▸ ]
Note: Report data time zone is based on EST or EDT.

325 — Filters

ADVERTISERS*
[ Atlas New Integration Testing X ]

[ Add Filter ▸ ]

330 — Columns

335 — FIELDS*
[ Advertiser Name X ] [ Campaign Name X ] [ Placement Name X ]

340 — METRICS*
[ Impressions X ] [ Clicks X ] [ Reach (People) X ] [ Reach (Cookie) X ] [ Frequency (Cookie) X ] [ Frequency (People) X ]

FIG. 3A

|   | A | B | C | D | E | F | G | H | I |
|---|---|---|---|---|---|---|---|---|---|
| 1 | Report Title | User | Run on Date | Timezone | | | | | |
| 2 | sean iteration 2 | Atlas Test | 4/15/14 | EST | | | | | |
| 3 | | | | | | | | | |
| 4 | Advertiser Name | Campaign Name | Placement Name | Impressions | Clicks | Reach (Peo | Reach (Coo | Freq. (Coo | Freq. (People) |
| 5 | Atlas Co. | Atlas Campaign C1 | Atlas_Age_12-17_PeaceCorps | 674809691 | 31580 | 4032059 | 5631150 | 11.98 | 16.74 |
| 6 | Atlas Co. | Atlas Campaign C1 | Atlas_Age_12-17_RedCross | 43524654 | 20386 | 2981600 | 3935652 | 11.06 | 14.6 |
| 7 | Atlas Co. | Atlas Campaign C1 | Atlas_Age_18-24_RedCross | 8247589 | 3046 | 2092043 | 2355517 | 3.5 | 3.94 |
| 8 | Atlas Co. | Atlas Campaign C1 | Atlas_Age_18-34_PeaceCorps | 898556 | 491 | 481583 | 674193 | 1.33 | 1.87 |
| 9 | Atlas Co. | Atlas Campaign C1 | Atlas_Age_25-34_RedCross | 67642 | 32 | 52128 | -- | -- | 1.3 |
| 10 | Atlas Co. | Atlas Campaign C1 | Atlas_Age_35-44_RedCross | 104857 | 52 | 75757 | -- | -- | 1.38 |
| 11 | Atlas Co. | Atlas Campaign C1 | Atlas_Age_35-54_PeaceCorps | 23607 | 29 | 18781 | 20001 | 1.18 | 1.26 |

FIG. 3B

EXECUTION ENGINE FOR GENERATING REPORTS FOR MEASURING EFFECTIVENESS OF ADVERTISING CAMPAIGNS

BACKGROUND

This invention relates to generation of reports for measuring effectiveness of advertising campaigns, for example, reports related to attribution of credit for conversion events.

Online advertising is increasingly being used by advertisers. Advertisers have different advertising campaigns to utilize online advertising to promote their products. Advertisers want to measure effectiveness of their advertising campaigns so that they can refine their existing advertising campaigns or come up with better advertising campaigns. Advertisers evaluate different types of metrics to measure the effectiveness of their online advertisement campaigns. For example, advertisers use metrics based on attribution data that determines which campaign or which part of a campaign, for example, a specific advertisement should be given credit when a conversion event occurs based on a user's history.

Online systems store raw information, for example various clicks performed by users, various webpages displayed to users and so on. However building reports evaluating advertising campaigns based on this information often requires generating complex queries to retrieve the required information and process it for presentation as a report. Drafting queries for presenting information required by advertisers for evaluating their campaigns is often complex and requires knowledge of experts who understand the underlying representation of data, metrics used by the advertisers, and are experts at drafting database queries. As a result, conventional techniques for generating reports are expensive for advertisers and/or result in poorly designed, complex, monolithic queries that can be slow to perform.

SUMMARY

Embodiments of the invention process reports describing advertising campaigns, for example, reports comprising metrics for evaluating advertising campaigns. A report execution engine maintains a plurality of generators, each generator comprising instructions to generate an execution plan corresponding to one or more columns of reports. For example, a generator may include instructions to generate an execution plan for columns describing search keywords for a search advertising campaign, whereas another generator may include instructions to generate an execution plan for columns describing conversions. The report execution engine receives a report definition for processing. The report execution engine sends the received report definition to a first generator for generating a sub-plan for processing a particular column of the report. The report execution engine sends the report definition for processing to a second generator for processing the remaining columns of the report definition. The second generator generates a second sub-plan for processing the remaining columns. The report execution engine generates a combined execution plan comprising the first sub-plan and the second sub-plan. The report execution engine executes the combined execution plan to generate results of the report. The report execution engine sends the results of the report for presentation.

In an embodiment, the report execution engine identifies the first generator by sending the report definition to each of a series of generators. A generator may return a value indicating that the generator does not include instructions to generate an execution plan for any column of the report definition. The report execution engine provides the report definition to each of a series of generators until it finds a generator that includes instructions to generate an execution plan for at least a column of the report definition. The report execution engine provides the report definition to other generators for generating sub-plans for remaining columns.

In an embodiment, the first generator provides the report definition to other generators in the series until it finds another generator that can process another column of the report. The first generator receives a sub-plan for the remaining columns of the report from the other generator. The first generator combines the received sub-plan with the sub-plan generated by the generator itself.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 3A is a screenshot of a user interface for allowing users to specify a report definition, in accordance with an embodiment of the invention.

FIG. 3B is a screenshot of a user interface showing the result of execution of a report, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention allow users to define reports for evaluating advertising campaigns. The reports may specify attributes of advertising campaigns, for example, advertising campaign names along with metrics for evaluating advertising campaigns. The system allows users to generate different types of reports including advertising campaign statistics reports, conversion or attribution reports, search campaign reports, frequency distribution reports for advertising campaigns and so on. Statistics reports include information describing impressions, conversions, clicks, reach, and so on. Search campaign reports include information describing which campaigns to attribute search keywords to. Frequency distribution reports include information describing reach of advertising campaigns and overlap of reach. An advertiser may use a frequency distribution report to analyze whether the advertiser should advertise on one website as compared to another or on both websites.

Figure 1:
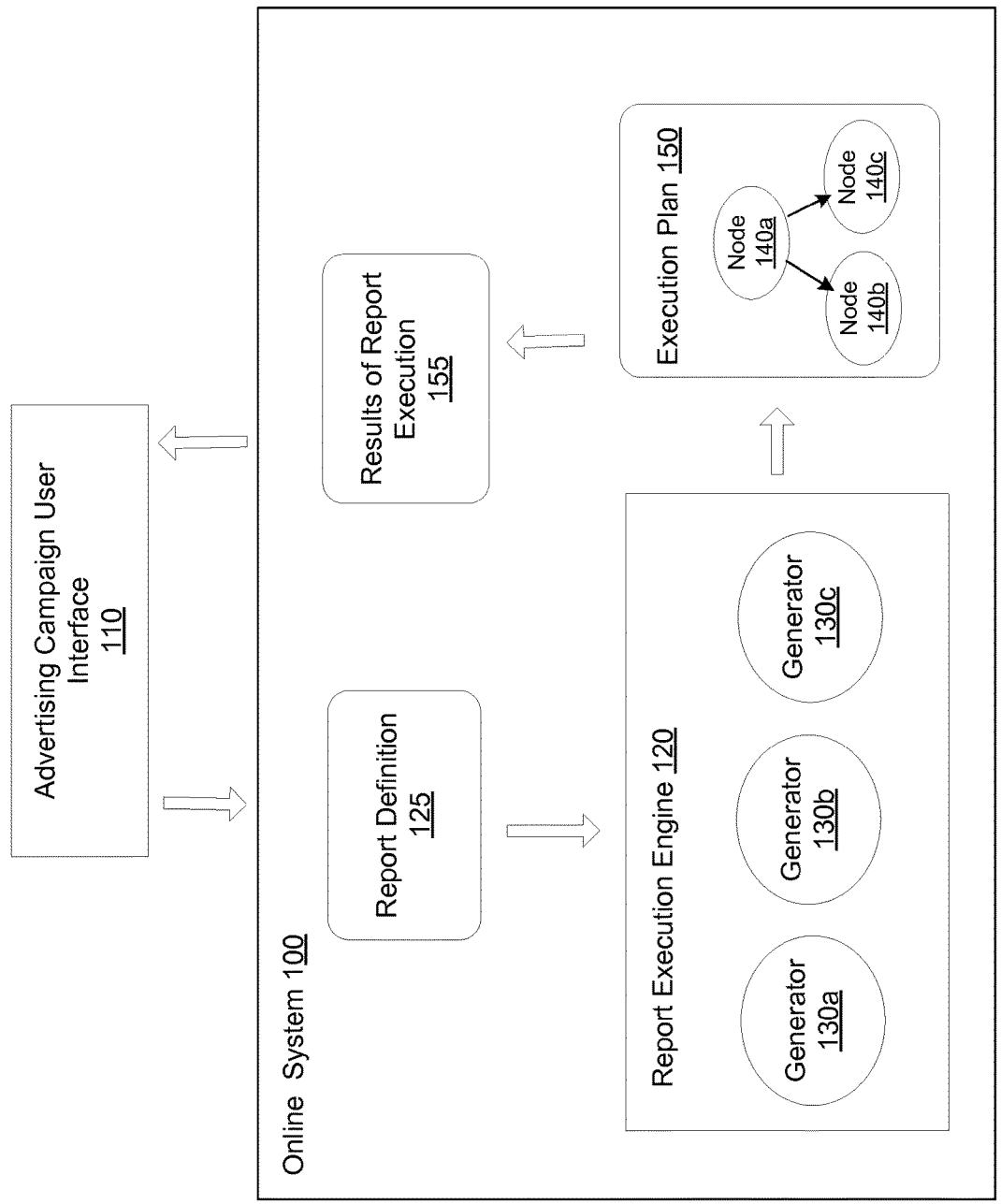
FIG. 1 is a diagram of the system environment for generating reports for evaluating advertising campaigns, in accordance with an embodiment of the invention.

FIG. 1 is a diagram of the system environment for generating reports for evaluating advertising campaigns, in accordance with an embodiment of the invention. The system environment shown in FIG. 1 includes an advertising campaign user interface 110 and an online system 100 comprising a report execution engine 120. FIG. 1 shows various entities, for example, objects represented by the online system 100 for processing report definitions for evaluating advertising campaigns.

The report execution engine 120 includes generators 130 that represent software modules comprising instructions for generating at least a portion of an execution plan corresponding to one or more columns of a report definition. The instructions of a generator 130 can be executed by a computer processor. For example, different generators may include instructions to generate execution plans for columns representing different metrics for evaluating advertising campaigns. In an embodiment, generators include a method to generate execution plan for particular types of columns specified in a report definition. A generator 130 may recursively call the method of other generators (without introducing cycles in the invocation sequence) thereby causing the other generators to generate execution plans for other columns of the report definition. The recursive execution of the method for generating execution plans causes the generation of the complete execution plan for the report definition.

The online system 100 shown in FIG. 1 provides the benefits of rapid development of generators, thereby providing efficiency in extending the system and building new reports. The online system 100 shown in FIG. 1 allows development of generators 130 independent of each other. For example, a developer may use a particular attribution model or a particular type of metric that is not available in the online system 100 and develop code for a generator based on that model or metric for the online system 100. The architecture of the report execution engine 120 allows developers to develop generators without having to modify code of other generators that are already available in the report execution engine 120. However, a user that provides report definitions to the online system 100 for processing can cause the report execution engine 120 to invoke different generators 130 by providing a report definition that requests metrics supported by these generators.

The advertising campaign user interface 110 receives specification of a report definition 125 associated with an advertising campaign from a user. The advertising campaign user interface 110 sends the report definition 125 to a report execution engine 120. The report execution engine 120 invokes one or more generators to generate an execution plan 150 for the report definition 125.

Different generators may generate different portions of the execution plan 150. For example, the report definition may include two ad campaign metrics that correspond to two different generators of the report execution engine 120. Each of these two generators may generate a different portion of the execution plan, each portion processing data for the corresponding metric.

The execution plan 150 comprises nodes, each node representing instructions to perform certain computation of the execution plan. For example, a node may retrieve data stored in the database, another node may combine two different types of data retrieved from the database, another node may order data processed by other nodes, and so on. Different types of nodes used by execution plans are described herein.

The report execution engine 120 generates the results 155 of the report using the generated execution plan 150. The report execution engine 120 processes the nodes of the execution plan. The result of a node may be provided as input to another node. For example, as shown in FIG. 1, the report execution engine 120 uses the results of execution of nodes 140b and 140c as inputs to the node 140a. The result of execution of node 140a represents the result of the report. The online system 100 sends the result 155 of execution of the report definition to the advertising campaign user interface 110 for presentation to a user.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

System Architecture

Figure 2:
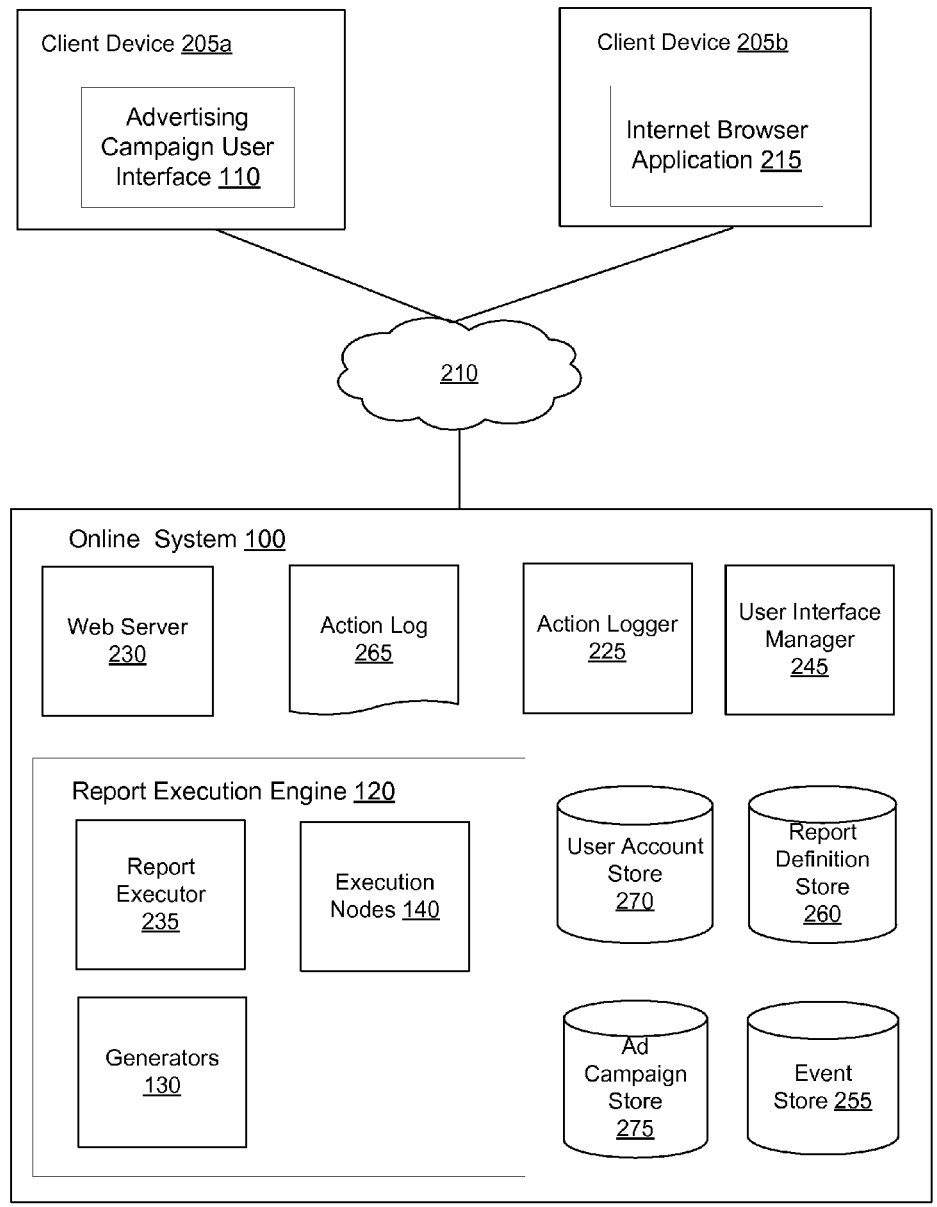
FIG. 2 is a high level block diagram illustrating the system architecture of a report execution engine, in accordance with an embodiment of the invention.

FIG. 2 is a high level block diagram illustrating the system architecture of a report execution engine, in accordance with an embodiment of the invention. The system environment comprises one or more client devices 205, an online system 100, and a network 210. In alternative configurations, different and/or additional modules can be included in the system.

The client devices 205 comprise one or more computing devices that can receive user input and can transmit and receive data via the network 210. In one embodiment, the client device 205 is a conventional computer system executing, for example, a Microsoft Windows-compatible operating system (OS), Apple OS X, and/or a Linux distribution. In another embodiment, the client device 205 can be a device having computer functionality, such as a personal digital assistant (PDA), mobile telephone, video game system, etc.

The client device 205 can execute an application, for example, an internet browser application 215 that allows a user of the client device 205 to interact with the online system 100. The online system 100 receives various requests from users, for example, via the internet browser application 215. The interactions may correspond to various actions performed by users including retrieving information, sending messages, receiving impressions of advertisements, clicking on advertisements, performing transactions, performing searches, and so on. Several of these actions are relevant for attribution of conversion credit. For example, if a user performs a search and then clicks on an advertisement displayed with the search results, the action of the user corresponding to performing the search may be attributed to the conversion associated with clicking on the advertisement.

Some client devices 205a may also be used by the online system 100 for presenting the advertising campaign user interface 110. The online system 100 receives report definitions provided by users using the advertising campaign user interface 110 executing on the client device 205a. The online system 100 generates reports based on these report definitions and presents the reports to users using the advertising campaign user interface 110.

The network 210 allows the client devices 205 to interact with the online system 100. In one embodiment, the network 210 uses standard communications technologies and/or protocols. Thus, the network 210 can include links using technologies such as Ethernet, 802.11, worldwide interoperability for microwave access (WiMAX), 3G, digital subscriber line (DSL), etc. The data exchanged over the network 210 can be represented using technologies and/or formats including the hypertext markup language (HTML), the extensible markup language (XML), etc.

The online system 100 includes a web server 230, an action logger 225, an action log 265, a user interface manager 245, a report definition store 260, a user account store 270, an ad campaign store 275, an event store 255, and the report execution engine 120. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system. Although FIG. 1 shows various modules as included within the online system 100, other embodiments may distribute the modules across multiple systems. For example, the modules web server 230, action log 265, and action logger 225 may be included in the online system whereas the report definition store 260 and report execution engine 120 may be included in a reporting system (not shown in FIG. 1) that interacts with the online system 100 using the network 210.

The web server 230 links the online system 100 via the network 210 to one or more client devices 205. The web server 230 serves web pages, as well as other web-related content, such as Java, Flash, XML, and so forth. For example, the web server 230 may provide the functionality of receiving and routing messages between the online system 100 and the client devices 205, for example, instant messages, queued messages (e.g., email), text and SMS (short message service) messages, or messages sent using any other suitable messaging technique.

Figure 4:
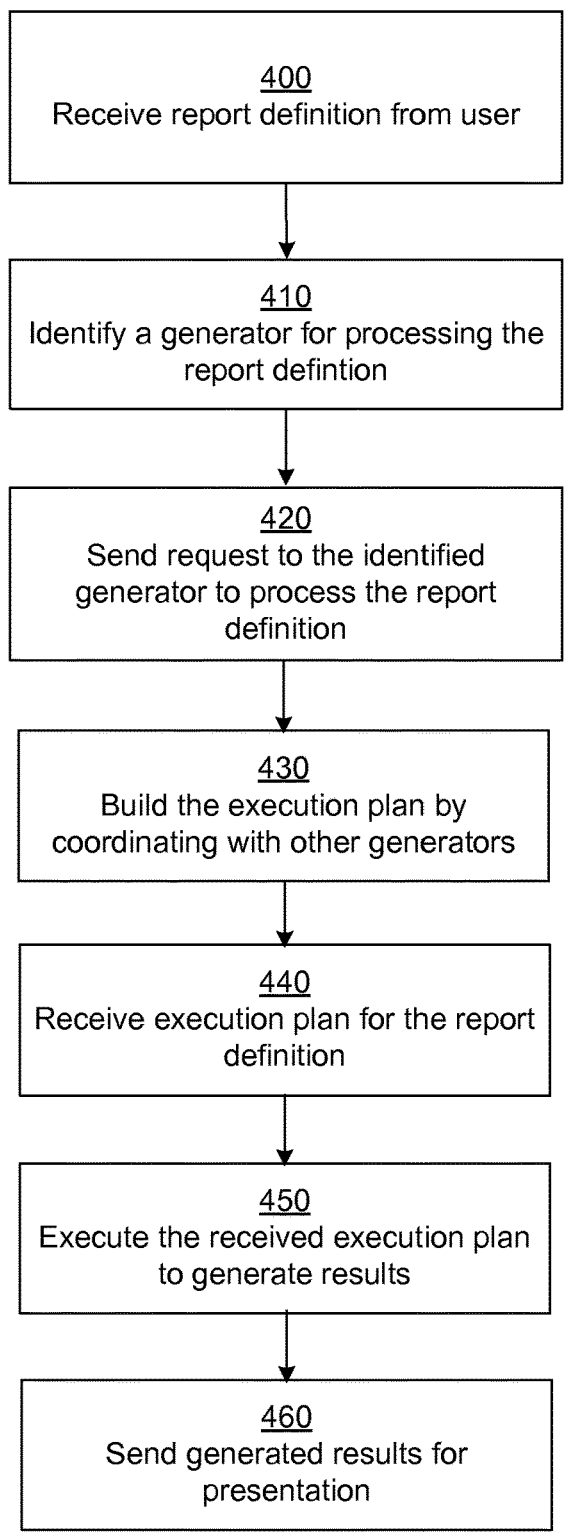
FIG. 4 is a flowchart of the overall process for generating an execution plan for a report definition, in accordance with one embodiment of the invention.

The user interface manager 245 manages the user interfaces presented to users for allowing users to generate report definitions for sending to the online system. The user interface manager 245 also presents the user interfaces displaying reports obtained as a result of execution of report definitions. FIGS. 3 and 4 show example screen shots of user interfaces that are configured for receiving report definitions and displaying report results. In an embodiment, the user interface manager 245 renders the user interfaces and sends information describing the user interfaces for presentation on a client device 205 via the network 210. For example, the user interfaces may be represented as web pages and presented to a user via a browser application executing on a client device 205.

The action logger 225 receives communications from the web server 230 about user actions on and/or off the online system 100. The action logger 225 populates the action log 265 with information about user actions to track them. Such actions include retrieving information, sending messages, receiving impressions of advertisements, clicking on advertisements, performing transactions, performing searches, and so on. The online system uses the data available in the action log 265 to generate various reports related to advertising campaigns.

The user account store 270 stores information identifying various users of the online system 100. In an embodiment, the online system 100 requires users to register with the online system 100 and provide information for identifying the user, for example, first and last name as well as demographic information, for example, age, education, location, and so on. Actions of the various users stored in the action log 265 may be associated with a user account of the user that performed the action.

The ad campaign store 275 stores information describing various advertising campaigns. Attributes of advertising campaigns include advertising campaign identifier, advertising campaign name, advertising campaign description, the advertiser associated with the advertising campaign, various attributes describing the advertiser, and so on. The ad campaign store 275 stores information describing various entities within a campaign, for example, placements (a representation of a particular spot on a web page presented by a web site) and individual ads. Within a campaign, an advertiser may use multiple placements across multiple sites, and cycle multiple ads through each placement. An advertiser may request in a report, the number of actions that happened on each placement, the number of actions that happened on each advertisement within a placement, and so on.

The report definition store 260 stores report definitions received by the online system 100 from a user via the advertising campaign user interface 110. The online system 100 may receive requests to execute report definitions previously stored in the report definition store of requests specifying new report definitions. The report definitions are processed by the report execution engine 120.

The event store 255 stores various events occurring in the online system 100. These events include various interactions performed by users that are relevant to generating reports for advertising campaigns. The event store 255 stores information describing these various events using a schema that is efficient for making queries about the events. In an embodiment, each event is represented as a tuple comprising an event identifier, a timestamp associated with the event, a type of the event, and other data relevant to the event.

The report execution engine 120 comprises various components including a report executor 235, execution nodes 140, and generators 130. Various embodiments may include other modules as part of report execution engine 120. Some of the modules shown in FIG. 2 as part of the report execution engine 120 may be stored as modules independent of the report execution engine 120 or as part of other modules.

An event may be associated with one or more users represented in the user account store 270. For example, an event representing an interaction with the online store is associated with the user that performed the interaction. An event representing a communication may be associated with a source user and a target user for the communication. In an embodiment, an event store 255 is represented as a relational database but can be stored using any other representation, for example, other types of databases or as a file.

The data stored in event store 255 is linked to the data stored in ad campaign store 275. For example, events stored in event store 255 may represent impressions of advertisements that are linked to advertising campaigns. Similarly, if a user clicks on an advertisement, the corresponding event stored in event store 255 is linked to a corresponding advertising campaign.

In some embodiments, portions of the schema used in the event store 255 may be defined by a third party that either provides the data stored in that portion of the schema or provides instructions for populating data that portion of event store 255. Typically, the third party that defines the schema of a portion of the event store also provides generators that process data from that portion of the even store 255. For example, a third party may define a portion of schema storing information associated with search campaigns used by search partner generators. This portion of schema conforms to a data model defined by the third party associated with search campaigns.

The data stored in the event store 255 may be obtained from the action log 265 or from external systems. The action log 265 stores the data in a format that may not be efficient for executing queries. For example, the action log 265 may store the data as a file(s) to which data is appended as it is received. Furthermore, the action log 265 may store information that may not be relevant for generating reports for advertising campaigns. For example, the action log 265 may store various errors that occur in different modules of the online system, output of debug statements, and so on. The data from action log 265 may be periodically moved to the event store 255 by an offline process or a process that executes in the background.

The report executor 235 receives requests to generate and execute execution plans for report definitions, for example, requests sent via an advertising campaign user interface 110. The report executor 235 interacts with different generators to generate an execution plan for a report definition.

Each generator 130 is configured to generate a sub-plan for one or more columns that may be requested in report definitions. Various generators interact with each other to generate execution plans of various portions of a given report definition and combining them to generate a combined execution plan. In an embodiment, a generator generates a first sub-plan corresponding to a portion of the report definition and receives a second sub-plan for another portion of the report definition from another generator. The generator generates an execution plan that combines the two sub-plans. This process is executed recursively, for example, the generator returns the combined execution plan to another generator which in turn may combine the execution plan with another sub-plan, and so on. Finally the overall execution plan for the report definition is provided by one of the generators to the report executor 235. The report executor 235 executes the overall execution plan to generate results of a report based on the report definition.

Execution Plan

The report execution engine 120 generates an execution plan for a report definition. Various generators generate portions of the execution plan corresponding to different portions (for example, columns) of the report definition. The execution plan comprises nodes representing sets of instructions for execution as part of the execution plan. A node may take input data from one or more other nodes, process the data and provide results to another node (or nodes.) The nodes may be organized as a hierarchy based on parent child relations. Accordingly, a node gets input data from its child nodes and returns the result to its parent node. A node may comprise queries for retrieving information from the event store 255, instructions for combining data from different nodes, instructions for determining specific metrics for evaluating ad campaigns, and so on. In an embodiment, the report executor 235 creates a thread for executing instructions of a node. The report executor 235 maintains a pool of threads. The created thread executes the instructions of the node.

In an embodiment, a node is represented by an object that support two methods, a start execution method and a method to get the next row of data generated by the node. The start execution method can be invoked recursively. Accordingly, a root node starts execution and invokes the start execution methods of its children nodes. Each child node executes the start execution method of its children nodes. The method to get the next row of data is typically invoked repeatedly by a caller to get rows of data until no more data is left to process.

There are different types of nodes that can be used by generators as part of an execution plan. A basic statistics node retrieves information stored in various stores of the online store, for example, the event store 255 by executing queries. The information accessed by the basic statistics node may include dimensions describing ad campaigns, name of placement, name of advertisement, name of publisher web site, number of impressions, number of clicks, number of unique people that viewed the advertisement, information describing events, for example, date of the event, and so on.

An aggregation node determines various types of aggregate values, for example, count, sum, mean, maximum, minimum, and so on. A project node rearranges the order in which columns of the result are presented. The project node may also select a subset of columns obtained in an intermediate result. For example, a generator may add intermediate columns that are used for processing even though the columns are not requested in the report definition. The project node removes these columns from the result.

A calculator node computes derived values from previously computed values. A labeler node labels the results of the report. Certain nodes comprise logic specific to attribution for an advertisement. For example, an attribution decider node determines the entity that is attributed to a conversion based on an attribution model. A filter conversion event node uses certain criteria for filtering data and filters events based on the criteria. An example criterion is time between events. For example, if the time interval between two events is below a threshold (say one second), one of the events is assumed to be a duplicate of the other event and dropped A merge node combines results from two or more different nodes. The merge node may use different types of logic to combine results of two nodes, for example, the merge node may combine two sets of values based on concatenation operation, join operation, union operation, cross product operation, and the like. The join operation may be an inner join or an outer join. In an embodiment, each type of mechanism of combining two sets of values is represented by a different type of nodes, for example, a hash join node, a union node, a left outer join node, and so on.

In an embodiment, a generator determines the type of operator used to combine results of two sub-plans based on the type of data returned by each sub-plan. For example, if the generator determines that each sub-plan is returning a disjoint set of complete rows, the generator combines the two results using a node that performs a concatenate operation. This ensures that the final result of the concatenate operation contains all the rows from each sub-plan. On the other hand, if the generator determines that each sub-plan returns a set of partial rows, then the generator uses a node that implements a join operator to construct complete rows.

In an embodiment, a generator decides the type of join based on desired result for a report. The generator may be designed so as to incorporate business logic based on knowledge of the underlying data and product decisions. For example, when an attribution generator that joins the results from the basic statistics generator to the conversion count results uses an outer join. This is predetermined since there can rows in one data set that do not match rows in the other data set. For example, on a particular date, there may be some impressions for an advertisement, but no conversions. In this situation, the attribution generator uses outer join to allow the impressions row to go through and show in the report, even though there is no matching conversions row.

The specification of the results desired may be obtained from the report definition. For example, if the generator determines that null or empty values are desired for columns on the right hand side, the generator combines the results using an outer join. If the generator determines that the results needs to present full data for both sides of the join, the generator uses an inner join operator.

Advertising Campaign User Interface

A report definition received by the online system 100 includes various aspects of the requested report including, one or more of, a date range for filtering the data processed as input for the report, one or more filters, a set of columns representing the result, and one or more action tag identifiers. An action tag is an entity in the online system 100 that may be defined as part of a part of an advertising campaign. An action tag is a representation of an action taken by a user which is desired by the advertiser. For example, an action tag named 'added product X to shopping cart' may be defined in the online system 100. The online system 100 associates the entity representing this action tag with identifier (a unique number). A website associated with an advertiser sends information describing an event to Atlas whenever someone performs an action associated with the action tag, for example, when a user adds product X to a shopping cart. The information sent by the website includes the identifier of the action tag. The website may also send information identifying the user, for example, a cookie of the user. The online system scans through event history for that user. If the online system 100 determines that the user previously viewed an advertisement from that advertiser, the online system 100 considers the action associated with the action tag a conversion, and attributes credit for one conversion to the advertisement viewed by the user. If the online system 100 identifies multiple events (for example, the user viewed a few advertisements and clicked on one of them) the online system 100 attributes credit based on specific attribution models.

FIG. 3A is a screenshot of an advertising campaign user interface for allowing users to specify a report definition, in accordance with an embodiment of the invention. Other embodiments of the advertising campaign user interface may allow users to specify different type of information or the same type of information using different types of widgets. For example, an embodiment may use a text box to receive an attribute value instead of a drop down list.

As shown in FIG. 3A the advertising campaign user interface 110 presents different widgets to a user for receiving different aspects of a report definition. The advertising campaign user interface 110 presents text boxes to receive a report name 310 that identifies the report definition and a description 315 of the report. The advertising campaign user interface 110 allows users to specify dates 320 or date ranges for which the data needs to be processed for a report.

The advertising campaign user interface 110 allows users to specify filters 325, for example, the name of the advertisers, name of the advertising campaign, placements for an advertising campaign, and so on. The advertising campaign user interface 110 allows users to specify columns 330 of the report definition. The columns of the report include fields 335, for example, various dimensions of the advertising campaigns including advertiser name, campaign name, placement name, and so on. The columns also include metrics 340 including impressions, clicks, reach, frequency, and the like.

The advertising campaign user interface 110 allows users to specify an order for the columns. For example, the result data columns appear in the same order in which the user specifies the columns 330 in the advertising campaign user interface 110. If the user changes the order of columns 330 specified in the report definition, the corresponding order of result columns in the results is also changed.

FIG. 3B is a screenshot of a user interface showing the result of execution of a report, in accordance with an embodiment of the invention. The results of the report shown in FIG. 3B correspond to the report definition specified in FIG. 3A. Accordingly, the results show result columns corresponding to the fields 335 and metrics 340 specified in the report definition specified in FIG. 3A.

As shown in FIG. 3B, the result data includes result columns 350 corresponding to the fields 335, for example, advertiser name, advertising campaign name, and placement name. The result data also includes result columns 360 corresponding to the metrics 340, including impressions 360*a*, clicks 360*b*, reach (people) 360*c*, reach (cookies) 360*d*, frequency (cookies) 360*e*, frequency (people) 360*f*, and so on as specified in the report definition.

Process of Generating Reports

FIG. 4 is a flowchart of the overall process for generating an execution plan for a report definition, in accordance with one embodiment of the invention. The report execution engine 120 receives 400 a report definition 125 from the user. In an embodiment, the report execution engine 120 receives 400 the report definition from the web server 230 which in turn receives the report definition 125 from a client device 205. The client device 205 receives a request specifying the report definition 125 from the user via the advertising campaign user interface 110 and sends the request to the web server 230. The report execution engine 120 forwards the request specifying the report definition 125 to the report executor 235.

The report executor 235 identifies 410 a generator 130 for processing the report definition 125. In an embodiment, each generator 130 is configured to analyze the report definition and return a value (for example, null or zero) indicating whether the generator includes instructions to generate execution plans for any portion (e.g., column) of the report definition. The report executor 235 provides the report definition to a series of generators until a particular generator responds with information indicating that the generator includes instructions to generate execution plans for at least a term of the report definition. The report executor 235 identifies 410 that particular generator as the generator for starting the processing of the report definition.

The report executor 235 sends 420 a request to the identified generator to start processing the report definition. In some embodiments, the request to identify 410 a generator configured for processing at least a term of the report definition also acts as the request to process the report definition. For example, a generator that receives the request to determine whether the generator includes instructions to generate execution plans for any columns of the report definition may either return a value indicating that the generator does not include instructions to generate execution plan for any term of the report definition or the generator may start processing the report definition.

In another embodiment, the generators are arranged in a predetermined order as a sequence (or a series) and the report executor 235 sends 420 a request to process the report definition to the first generator in the sequence. If the generator includes instructions to generate execution plan for at least a term of the report definition, the generator starts processing the report definition. If the generator does not include instructions to generate execution plan for any terms of the report definition, the generator forwards the request to process the report definition to the next generator in the sequence.

The identified generator builds 430 an execution plan for generating a report from the report definition. The identified generator 430 coordinates with other generators to build the execution plan. The details of how a generator builds 430 an execution plan are provided in the description of FIG. 5.

The report executor 235 receives 440 the execution plan from the identified generator. In an embodiment, the report executor 235 receives 440 the top level node of the execution plan from the identified generator. The top level node may include children nodes. The report executor 235 executes 450 the execution plan to generate a report based on the report definition. For example, the executor 235 executes the plan by repeatedly invoking a method of the top level node that returns the next row of result data. The top level node in turn recursively executes a corresponding method of its children node to provide their respective portions of result data. The report executor 235 sends 460 the report data for presentation to a client device 205, for example, via the advertising campaign user interface 110.

Figure 5:
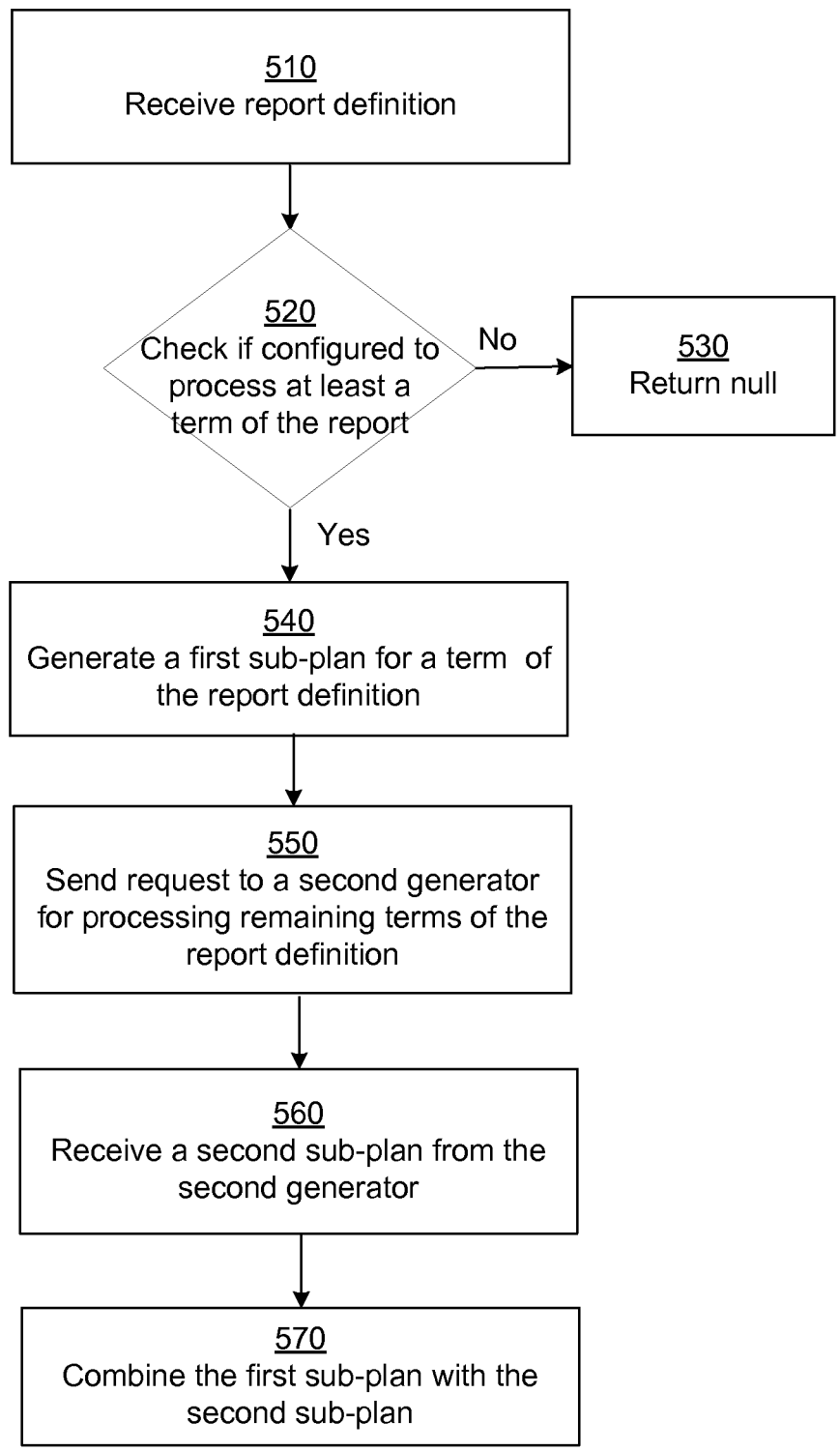
FIG. 5 is a flowchart of a process executed by a generator to generate a portion of an execution plan, in accordance with one embodiment of the invention.

FIG. 5 is a flowchart of a process executed by a generator to generate a portion of an execution plan, in accordance with one embodiment of the invention. The process shown in FIG. 5 is recursively executed by each generator. The report executor 235 initiates the process of generation of an execution plan by requesting a generator to invoke the process shown in FIG. 5 using a given report definition.

The generator 130 receives 510 a report definition. The generator 130 may receive the report definition from a report executor 235 or from another generator. The generator 130 checks 520 if the generator includes instructions to generate execution plan for at least a term of the report definition. For example, the generator 130 may iterate through terms of the report definition to determine if there is any term in the report definition that can be processed by the generator 130. If the generator determines that the generator does not include instructions to generate execution plan for any term of the report definition, the generator returns 530 a value indicating that the generator does not include instructions to generate execution plan for any term of the report definition, for example, a null value. In some embodiments, if generator determines that the generator does not include instructions to generate execution plan for any term of the report definition, the generator forwards the request to process the report definition to another generator.

If the generator determines 520 that the generator includes instructions to generate execution plan for a particular column of the report definition, the generator generates 540 a sub-plan for generating data corresponding to that particular term. The generator sends 550 a request to another generator to generate execution plans for the remaining columns of the report definition. In embodiments in which the generators are ordered in a sequence, the first generator continues iterating through the remaining generators (that occur in the sequence after the current generator) to determine if any other generator can process another column of the report definition. However, in other embodiments, the generators do not have any order and can be accessed in any arbitrary order.

If the first generator sends the report definition to another generator that returns 530 a null value, the first generator continues iterating through remaining generators until it finds a second generator that includes instructions to generate execution plan for another column of the report definition. The second generator iterates through the remaining generators to identify a generator includes instructions to generate execution plan for another column (other than the first and the second column.) This process continues until there are no more columns of the report definition remaining to be assigned to generators.

If all generators have been checked to determine whether they can process a term of the report definition and there are still columns of the report definition that are not assigned to any generator, the report execution engine 120 returns an error code indicating the report definition includes terms that cannot be processed by any available generator.

The second generator generates a second sub-plan for processing the remaining terms of the report definition. The second generator receives a third sub-plan for processing the remaining terms of the report definition (other than the first two terms processed by the first generator and the second generator) from the third generator, and so on. The first generator receives 560 the second sub-plan from the second generator. The first generator combines 570 the first sub-plan generated by the first generator with the second sub-plan received from the second generator. For example, the first generator uses nodes of the execution plan that combine the first sub-plan and the second sub-plan by using a join, concatenate, union, or any appropriate operator. The first generator returns the generated execution plan to the entity that sent a request for the execution plane, for example, another generator 130 or the report executor 235.

In an embodiment, a generator marks the term(s) of the report generator that the generator can process before providing the report definition to other generators. Accordingly, the subsequent generators do not review these terms. If the generator determines that all the columns of the report definition have been marked as being processed by a generator, the generator stops forwarding the report definition to other generators. In other embodiments a generator provides a list of the remaining columns of the report definition to another generator for processing.

Example Execution Plans

An example report definition requests statistics date and impression count for a particular time period, for example, a given month, for a particular advertising campaign. Accordingly, the report definition specifies a filter identifying a date range for the given month and a filter identifying the particular advertising campaign. The report definition further lists the columns statistics date, and impression count.

The following is a possible scenario of interactions between the report executor 235 and the generators 130 for generating the execution plan for this report definition. Assume that the report executor 235 sends the report definition to the first generator that generates execution plans for certain attribution metrics. The first generator analyzes the columns of the report definition to determine that the first generator is not configured to generate sub-plans for any of the columns specified in this report definition. Accordingly, the first generator returns a null value to the report executor 235. The report executor continues sending the report definition to other generators to identify a generator that is configured to generate sub-plan for at least a column of the report definition.

If a basic statistics generator receives the report definition, the basic statistics generator determines that it is configured to generate sub-plans for columns statistics date, and impression count. Since the basic statistics generator is configured to handle all columns of the report definition, the basic statistics generator generates the complete execution plan for generating the reports based on the report definition and returns the execution plan to the report executor 235 for execution. The report executor 235 executes the execution plan and provides the results data to the advertising campaign user interface 110.

Figure 6:
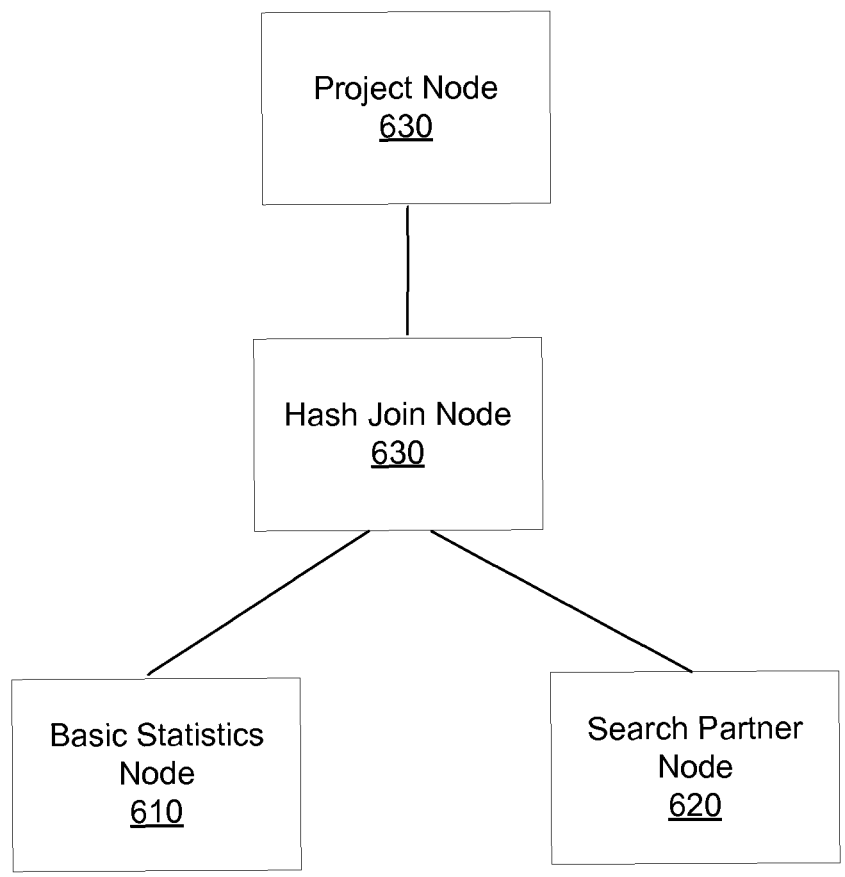
FIG. 6 is an example of execution plan generated for a given report definition, in accordance with one embodiment of the invention.

FIG. 6 is an example of execution plan generated for a given report definition, in accordance with one embodiment of the invention. The report definition for this example concerns results for a search campaign that presents advertisements in response to search keywords received from users. The columns requested by the report definition include the advertising campaign name, the search keywords for which the advertisement was presented, and the number of clicks on the advertisement for the corresponding search keyword.

Assume that the report executor 235 receives this report definition and provides the report definition to an attribution generator that generates plans for columns related to attribution. The attribution generator returns null indicating that the attribution generator is not configured to generate execution plan for any columns of the report. In response, assume that the report executor 235 provides the report definition to a basic statistics generator. The basic statistics generator determines that it is configured to generate execution plan for at least the advertising campaign name column. The basic statistics generator generates the basic statistics node 610 comprising instructions to generate the advertising campaign name column.

In some embodiments, a generator generates additional columns in a sub-plan so as to allow intermediate results based on the sub-plan to be joined with intermediate results generated by other sub-plans. For example, an additional column may be included that uniquely identifies each row of the intermediate results. The basic statistics generator determines that there are additional columns that need to be generated by other sub-plans and the intermediate results for these additional columns need to be joined to the advertising campaign name column. Accordingly, the basic statistics generator generates the basic statistics node that further comprises instructions to generate an advertising campaign id (identifier) column. The advertising campaign id column is used to join the intermediate results obtained by executing the basic statistics node 610 with other nodes of the plan (for example, the search partner node 620 described below). In an embodiment, a generator determines that an ID column should be added if it determines that the columns in the desired result are sourced from different nodes, but the subsets of columns from the different nodes don't overlap. For example, one child node may return a column campaign_name and another child node may return columns keywords and clicks. The generator uses predefined information indicating which columns belong to the same dimension. For example, campaign_name and campaign_ID are both part of the campaign dimension. The generator selects an identifier in the same dimension that can be provided by both children nodes and adds the identifier to the sub-plans of the children nodes.

The basic statistics generator determines that there are additional columns of the report definition for which the basic statistics generator does not include instructions for generating execution plans. Accordingly, the basic statistics generator continues for searching for another generator that includes instructions to generate execution plan for another column of the report definition. Assume that the basic statistics generator provides the report definition to a search partner generator. The search partner generator determines that it includes instructions to generate execution plan for the search keywords and the clicks columns. The search partner generator generates the search partner node 620 that comprises the execution sub-plan for determining the search keywords and the clicks columns. The search partner generator also determines that the intermediate results comprising the search keywords and the clicks columns need to be joined to the advertising campaign name column. Accordingly, the search partner generator generates instructions to generate an advertising campaign id column in the search partner node 620. The search partner generator returns the search partner node 620 comprising the execution sub-plan generated to the basic statistics generator.

The basic statistics generator receives the search partner node 620 comprising the sub-plan generated by the search partner generator and generates a combined execution plan by joining the basic statistics node 610 with the search partner node 620 using the hash join node 630. The hash join node 630 uses the advertising campaign id column to join the columns generated by the two sub-plans. Furthermore, the basic statistics generator adds a project node 630 to order the columns presented in the generated report and to eliminate columns that were generated as part of intermediate results that do not have to be displayed as part of the report definition, for example, the advertising campaign id column.

Figure 7A:
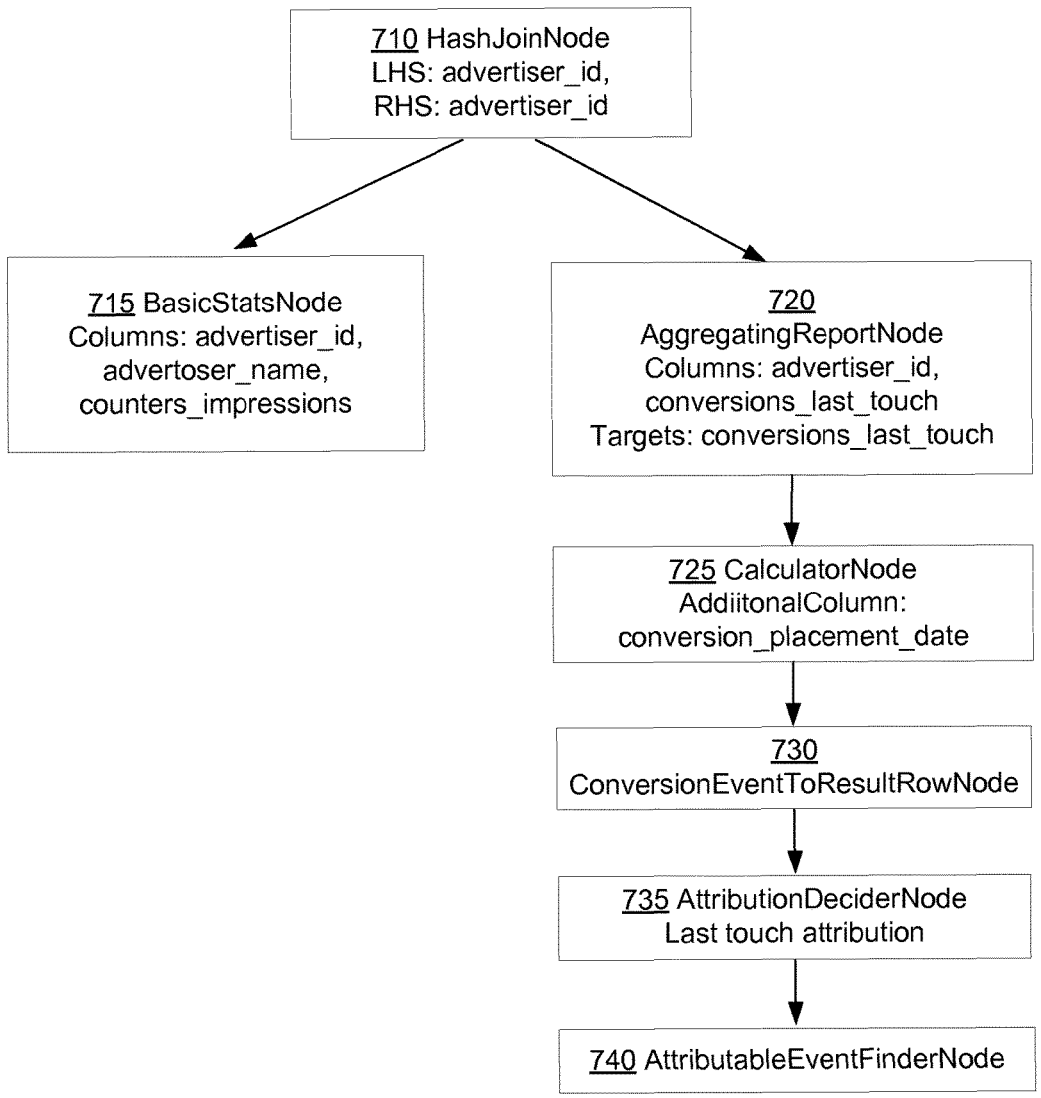
FIGS. 7A-7B show another example of execution plan generated for a given report definition, in accordance with one embodiment of the invention.
Figure 7B:
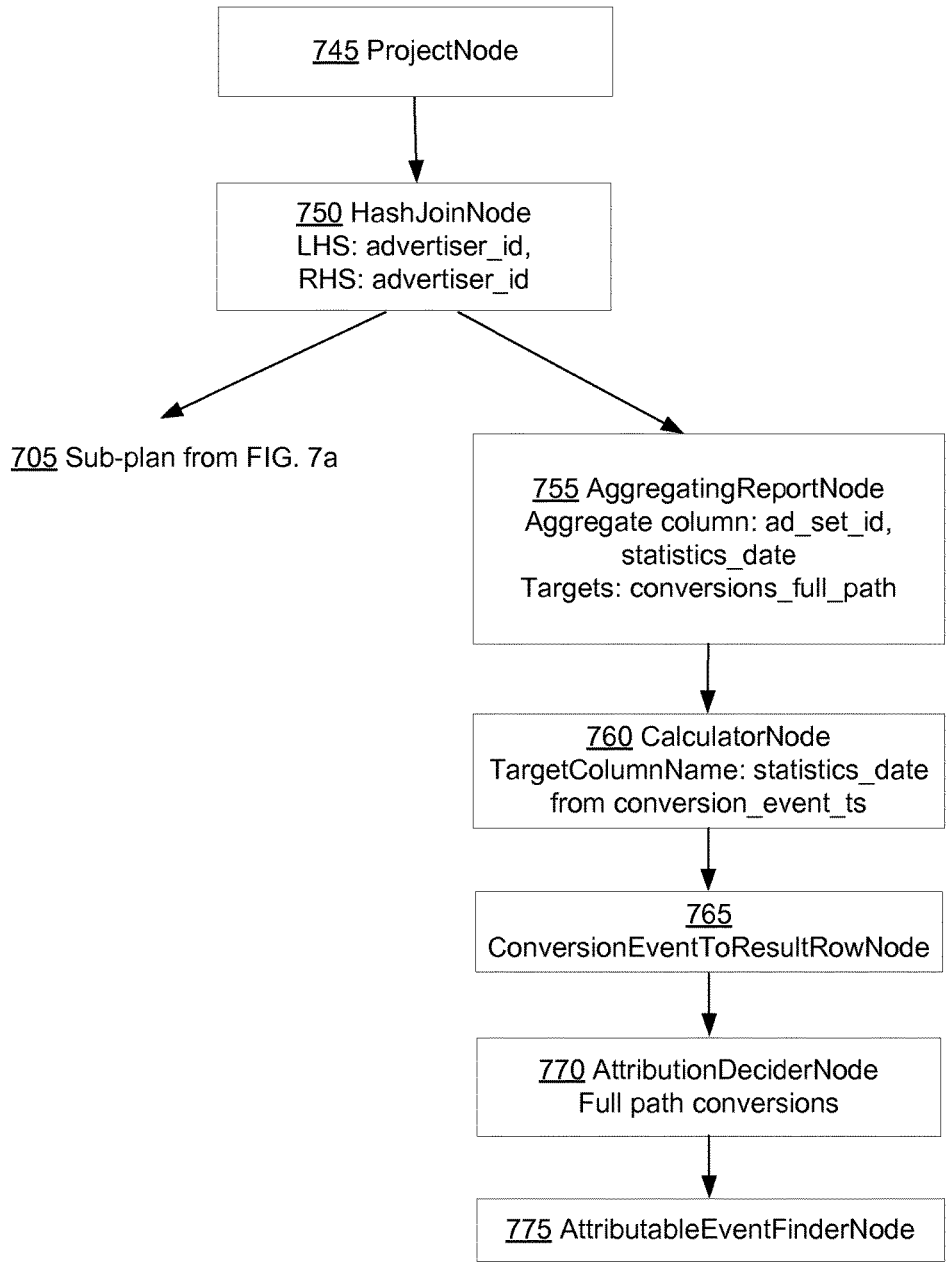

FIGS. 7A and 7B show another example of execution plan generated for a given report definition, in accordance with one embodiment of the invention. FIG. 7 shows the execution plan for a report that shows advertiser name, the impressions (column counters_impressions), last touch conversions (column conversions_last_touch), and full path conversions (column conversions_full_path).

The execution plan for the report definition may be generated by three generators. A first generator generates the sub-plan comprising the BasicStatsNode 715 that retrieves data for column counter_impressions, advertiser_name, and advertiser_id. The column advertiser_id is added by the BasicStatsNode 715 to allow joining the intermediate results of this sub-plan with intermediate results from other sub-plans.

A second generator configured to generate sub-plan for last touch conversions generates the sub-plan comprising the nodes 720, 725, 730, 735, and 740. The AttributableEventFinderNode 740 generates queries and instructions to retrieve various actions stored in the event store 255 that may be attributed to the conversions. The AttributionDeciderNode 735 generates instructions for determining the entities that are attributed credit based on some attribution model. The ConversionEventToResultRowNode 730 generates instructions to retrieve various related attributes based on the selected events and entities, for example, conversion event timestamp, advertiser id, advertisement id, advertising campaign id, click through URL (uniform resource locator), contributing event type, placement id, and so on. The CalculatorNode 725 generates instructions to introduce additional column conversion_placement_date. A calculator node encapsulates logic for adding a column comprising values determined based on existing columns. In the above example, the generator determines that none of the available columns exactly match the semantics of the conversion_placement_date column. However, the existing columns provide enough information to compute this column.

The ConversionEventToResultRowNode takes a conversion event, which may have a list of several past events that have been attributed some credit, and creates a result row for each <past event, conversion event> pair. The ConversionEventToResultRowNode transforms the ConversionEvent objects that can be processed by the attribution node into the result row (list of columns and values) objects that can be processed by the remaining nodes that are more generic (for example, aggregating node, join node, and so on). The AggregatingReportNode 720 aggregates the results by advertiser ids.

One of the first or the second generator may generate the HashJoinNode 710 that joins the intermediate results returned by the nodes AggregatingReportNode 720 and the BasicStatsNode 715. The join is based on advertiser id columns that were added by the first and second generators to their respective intermediate results to allow the join operation.

FIG. 7B shows the remaining part of the execution plan that is generated by a third generator configured to handle full path conversions. The nodes of the execution plan for the full path conversions column are similar to the execution plan for last touch conversions. In particular, the execution plan for the full path conversions column comprises the nodes AtttributableEventFinderNode 775, AttributionDeciderNode 770, ConversionEventToResultRowNode 765, CalculatorNode 760, and AggregatingReportNode 755. However these nodes are configured to generate columns relevant for full path conversions.

The different attribution models may be applied in one branch of the execution tree. The nodes such as AttributionDeciderNode are configured to calculate the attribution credit values for all desired models. For example, if a conversion event has a list of three past events, all three events are assigned a value for the last touch attribution credit: the most recent event is assigned a value of 1, and the other two are assigned a value zero. All three are also assigned another (non-zero) value for full path attribution credit such that each event gets considered.

Furthermore, the third generator generates a HashJoinNode 750 for joining the intermediate results generated by the HashJoinNode 710 with the intermediate results generated by the AggregatingReportNode 755. Furthermore, the generator adds a ProjectNode 745 to order the columns as requested in the report definition and also to eliminate columns that were used in intermediate results but not requested by the report definition, for example, advertiser id column. The third generator provides the overall execution plan rooted at the ProjectNode 745 to the report executor 235.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
  storing a plurality of generators, each generator comprising computer-executable instructions for generating a sub-plan, wherein the sub-plan includes instructions to generate execution plans for one or more columns of reports;
  receiving, by a report execution engine, a report definition specifying a plurality of columns that include one or more metrics based on user interactions with an online system;
  identifying a set of generators from the plurality of generators, each of the set of generators configured to generate execution plan of at least one of the plurality of columns specified by the report definition, the set of generators comprising a first generator, and a second generator, wherein the plurality of generators are arranged as a series of generators, the identifying comprising, repeating until all columns of the report definition are assigned to at least a generator:
    providing a set of columns of the report definition to generators from the series of generators until a particular generator responds with information indicating that the particular generator includes instructions to process at least a subset of columns from the set of columns;
assigning the subset of columns to the particular generator; and
providing the remaining columns of the set of columns to the remaining generators from the series of generators to assign the remaining columns to the plurality of generators;
generating a plurality of sub-plans for processing columns of the report definition, the generating comprising, for each generator assigned to at least a column of the report definition:
generating, by the generator, a sub-plan for processing the columns of the report definition assigned to the generator;
generating a combined execution plan by combining one or more pairs of sub-plans from the plurality of sub-plans, each pair of sub-plans comprising a first sub-plan and a second sub-plan, wherein the combined execution plan uses an operator to combine resulting data of the first sub-plan and resulting data of the second sub-plan;
executing, by the report execution engine, the combined execution plan to generate results based on the received report definition; and
sending, by the report execution engine, the generated results for presentation.

2. The computer-implemented method of claim 1, further comprising:
identifying the first generator, the identifying comprising, sending the report definition to each of a series of generators from the plurality of generators until a generator returns information indicating the generator includes instructions to generate execution plan for at least a column of the report definition; and
using the generator as the first generator.

3. The computer-implemented method of claim 2, further comprising:
providing information identifying the remaining columns of the report definition to one or more of the remaining generators from the plurality of generators for identifying the second generator.

4. The computer-implemented method of claim 1, wherein processing the remaining columns of the report definition by the second generator comprises:
generating, by the second generator, a sub-plan for a second column of the report definition; and
providing the remaining columns other than the first and the second column to a third generator for generating a third sub-plan.

5. The computer-implemented method of claim 4, further comprising:
receiving, from the third generator, a third sub-plan for processing the columns of the report definition other than the first column and the second column; and
generating the second sub-plan by combining the sub-plan for processing the second column with the third sub-plan.

6. The computer-implemented method of claim 1, wherein the operator for combining the first sub-plan and the second sub-plan is one of: a concatenate operator, a join operator, a cross product operator, or a union operator.

7. The computer-implemented method of claim 1, further comprising:
selecting the operator for combining the first sub-plan with the second sub-plan based on the results returned by the first sub-plan and the second sub-plan, the results comprising a first result set generated by the first sub-plan and a second result set generated by the second sub-plan.

8. The computer-implemented method of claim 7, further comprising:
responsive to determining that the first result set is distinct from the second result set, selecting a concatenate operator for combining the first sub-plan and the second sub-plan.

9. The computer-implemented method of claim 7, further comprising:
responsive to determining that the first result set and the second result set comprise partial rows, selecting a join operator for combining the first sub-plan and the second sub-plan.

10. The computer-implemented method of claim 9, further comprising:
responsive to determining that the report requires empty values of columns from one of the result sets, selecting an outer join operator for combining the first sub-plan and the second sub-plan.

11. The computer-implemented method of claim 9, further comprising:
responsive to determining that the report requires full data for columns from both the result sets, selecting an inner join operator for combining the first sub-plan and the second sub-plan.

12. The computer-implemented method of claim 1, further comprising:
receiving a new report definition using a first metric defined by a new generator and a second metric defined by an existing generator; and
generating an execution plan for the new report definition based on a sub-plan generated by the new generator and a sub-plan generated by the existing generator.

13. The computer-implemented method of claim 1, wherein the metrics associated with the advertising campaign comprise one or more of: information describing impressions of advertisements shown to users and information describing conversions.

14. The computer-implemented method of claim 1, wherein the report definition specifies a column comprising information identifying advertising campaigns.

15. The computer-implemented method of claim 1, further comprising:
introducing in the first sub-plan and the second sub-plan, additional columns not specified by the report definition; and
using the additional columns to combine intermediate results generated by first sub-plan with intermediate results generated by the second sub-plan.

16. The computer-implemented method of claim 1, wherein the second generator determines the operator based on a type of data returned by the first sub-plan and the second sub-plan.

17. The computer-implemented method of claim 1, wherein the operator is at least one of: a concatenate operator, an outer join operator, an inner join operator, or some combination thereof.

18. A non-transitory computer readable storage medium storing instructions for:
storing a plurality of generators, each generator comprising computer-executable instructions for generating a sub-plan, wherein the sub-plan includes instructions to generate execution plans for one or more columns of reports;

receiving, by a report execution engine, a report definition specifying a plurality of columns that include one or more metrics based on user interactions with an online system;

identifying a set of generators from the plurality of generators, each of the set of generators configured to generate execution plan of at least one of the plurality of columns specified by the report definition, the set of generators comprising a first generator, and a second generator, wherein the plurality of generators are arranged as a series of generators, the identifying comprising, repeating until all columns of the report definition are assigned to at least a generator:

providing a set of columns of the report definition to generators from the series of generators until a particular generator responds with information indicating that the particular generator includes instructions to process at least a subset of columns from the set of columns;

assigning the subset of columns to the particular generator; and providing the remaining columns of the set of columns to the remaining generators from the series of generators to assign the remaining columns to the plurality of generators;

generating a plurality of sub-plans for processing columns of the report definition, the generating comprising, for each generator assigned to at least a column of the report definition:

generating, by the generator, a sub-plan for processing the columns of the report definition assigned to the generator;

generating a combined execution plan by combining one or more pairs of sub-plans from the plurality of sub-plans, each pair of sub-plans comprising a first sub-plan and a second sub-plan, wherein the combined execution plan uses an operator to combine resulting data of the first sub-plan and resulting data of the second sub-plan;

executing, by the report execution engine, the combined execution plan to generate results based on the received report definition; and sending, by the report execution engine, the generated results for presentation.

19. The non-transitory computer readable storage medium of claim 18, further comprising:

identifying the first generator, the identifying comprising, sending the report definition to each of series of generators from the plurality of generators until a generator returns information indicating the generator includes instructions to generate execution plan for at least a column of the report definition; and using the generator as the first generator.

20. The non-transitory computer readable storage medium of claim 18, further comprising, wherein processing the remaining columns of the report definition by the second generator comprises:

generating, by the second generator, a sub-plan for a second column of the report definition; and providing the remaining columns of the report definition to a third generator for generating a third sub-plan for columns of the report definition other than the first column and the second column.

21. The non-transitory computer readable storage medium of claim 18, further comprising:

selecting the operator for combining the first sub-plan with the second sub-plan based on the results returned by the first sub-plan and the second sub-plan, the results comprising a first result set generated by the first sub-plan and a second result set generated by the second sub-plan.

22. A computer-implemented system comprising:

a computer processor; and a non-transitory computer readable storage medium storing instructions for:

storing a plurality of generators, each generator comprising computer-executable instructions for generating a sub-plan, wherein the sub-plan includes instructions to generate execution plans for one or more columns of reports;

receiving, by a report execution engine, a report definition specifying a plurality of columns that include one or more metrics based on user interactions with an online system;

identifying a set of generators from the plurality of generators, each of the set of generators configured to generate execution plan of at least one of the plurality of columns specified by the report definition, the set of generators comprising a first generator, and a second generator, wherein the plurality of generators are arranged as a series of generators, the identifying comprising, repeating until all columns of the report definition are assigned to at least a generator:

providing a set of columns of the report definition to generators from the series of generators until a particular generator responds with information indicating that the particular generator includes instructions to process at least a subset of columns from the set of columns;

assigning the subset of columns to the particular generator; and providing the remaining columns of the set of columns to the remaining generators from the series of generators to assign the remaining columns to the plurality of generators;

generating a plurality of sub-plans for processing columns of the report definition, the generating comprising, for each generator assigned to at least a column of the report definition:

generating, by the generator, a sub-plan for processing the columns of the report definition assigned to the generator;

generating a combined execution plan by combining one or more pairs of sub-plans from the plurality of sub-plans, each pair of sub-plans comprising a first sub-plan and a second sub-plan, wherein the combined execution plan uses an operator to combine resulting data of the first sub-plan and resulting data of the second sub-plan;

executing, by the report execution engine, the combined execution plan to generate results based on the received report definition; and sending, by the report execution engine, the generated results for presentation.

* * * * *

UNITED STATES PATENT AND TRADEMARK OFFICE
CERTIFICATE OF CORRECTION

PATENT NO.         : 10,115,123 B2
APPLICATION NO.    : 14/488577
DATED              : October 30, 2018
INVENTOR(S)        : Jason George McHugh and Sean Michael Snyder Page 1 of 1

It is certified that error appears in the above-identified patent and that said Letters Patent is hereby corrected as shown below:

In the Claims

Column 16, Claim 1, Line 13, delete "generate execution plan" and insert --generate an execution plan--

Column 17, Claim 2, Line 7, delete "generate execution plan" and insert --generate an execution plan--

Column 18, Claim 15, Line 7, delete "generated by first sub-plan" and insert --generated by the first sub-plan--

Column 19, Claim 18, Line 7, delete "generate execution plan" and insert --generate an execution plan--

Column 19, Claim 19, Line 7, delete "generate execution plan" and insert --generate an execution plan--

Column 20, Claim 22, Line 16, delete "generate execution plan" and insert --generate an execution plan--

Signed and Sealed this
Eighteenth Day of June, 2019

Andrei Iancu
*Director of the United States Patent and Trademark Office*